(12) United States Patent
Lindsey et al.

(10) Patent No.: US 12,705,354 B1
(45) Date of Patent: Aug. 11, 2026

(54) HOOK-BASED TECHNIQUE FOR COUNTERING RANSOMWARE

(71) Applicant: Halcyon Tech, Inc., Austin, TX (US)

(72) Inventors: Clark Lindsey, Loudon, TN (US); Robert Bushner, Homeland, CA (US); Alejandro Espinoza, San Marcos, CA (US); Kristen Lamb, Austin, TX (US); Seagen Levites, Oregon City, OR (US); Jonathan Miller, Poway, CA (US); Ryan Smith, Austin, TX (US); Vu Ta, Fellbach (DE); Chetan Varde, Bellevue, WA (US)

(73) Assignee: Halcyon Tech, Inc., Austin, TX (US)

( * ) Notice: Subject to any disclaimer, the term of this patent is extended or adjusted under 35 U.S.C. 154(b) by 5 days.

(21) Appl. No.: 19/051,100

(22) Filed: Feb. 11, 2025

(51) Int. Cl.
*G06F 21/56* (2013.01)
*G06F 21/55* (2013.01)
*G06F 21/60* (2013.01)

(52) U.S. Cl.
CPC .......... *G06F 21/566* (2013.01); *G06F 21/554* (2013.01); *G06F 21/602* (2013.01)

(58) Field of Classification Search
None
See application file for complete search history.

(56) References Cited

U.S. PATENT DOCUMENTS

2007/0168285 A1* 7/2007 Girtakovskis ........ G06Q 10/107 705/50
2019/0188384 A1* 6/2019 Tanda .................. G06F 21/566
2020/0097653 A1* 3/2020 Mehta ...................... G06N 3/08
2021/0026961 A1* 1/2021 Underwood ........ G06F 16/2246

* cited by examiner

*Primary Examiner* — Kevin S Mai
(74) *Attorney, Agent, or Firm* — Jones Day

(57) ABSTRACT

An injected module (IM) is deployed in a process space executing on a computing device. The IM is then executed to inspect resources of the computing device and determine, based on the inspection of the resources, at least one hook to install in response to a ransomware attack. The process space then install the hook(s) to intercept calls within the process space. The hook(s) captures parameters characterizing techniques used in the ransomware attack. The process space reports at least a portion of the reported parameters to an anti-ransomware monitoring platform. An agent executed on the computing device can receive a decryption package from the anti-ransomware monitoring platform. This decryption package being responsive to the reported captured parameters. The agent can then decrypt one or more files in a computing environment associated with the computing device using the decryption package. Related apparatus, systems, techniques and articles are also described.

30 Claims, 3 Drawing Sheets

100
COMPUTING DEVICE 120
AGENT 122
PROCESS SPACE 124
MONITORING PLATFORM 130
INTERNET 110
MESSAGING BUS 126

HOOK-BASED TECHNIQUE FOR COUNTERING RANSOMWARE

TECHNICAL FIELD

The subject matter described herein relates to techniques for identifying and countering ransomware attacks by selectively installing hooks within a monitored process space.

BACKGROUND

Cybersecurity threats are designed to evade modern security tools by delivering or otherwise executing code within a computing environment which, when executed, implement various malicious activities. Given the increasing sophistication of these threats, security tools within the computing environment can be bypassed resulting in problematic code being inserted, accessed, stored, or executed. In order to counter such activities, agents can be executed on endpoints to monitor and report events that are indicative of a security breach.

SUMMARY

In a first aspect, an injected module (IM) is deployed in a process space executing on a computing device. The IM is then executed to inspect (e.g., scan, etc.) resources of the computing device and determine, based on the inspection of the resources, at least one hook to install in response to a ransomware attack. The process space then installs the hook(s) to intercept calls within the process space. The hook(s) captures parameters characterizing techniques used in the ransomware attack. The process space reports at least a portion of the reported parameters to an anti-ransomware monitoring platform. An agent executed on the computing device can receive a decryption package from the anti-ransomware monitoring platform. This decryption package being responsive to the reported captured parameters. The agent can then decrypt one or more files in a computing environment associated with the computing device using the decryption package.

The agent can cause the decrypted one or more files to be transported from the computing environment to a safe computing environment.

The inspected resources can include one or more cryptography libraries. In addition to or in the alternative, the inspected resources comprise one or more data exfiltration and networking libraries.

The determination of at least one hook to installed can be based on the captured parameters indicating calls to exported functions by way of a particular type of library. In addition to or in the alternative, the determination of at least one hook to installed can be based on the captured parameters indicating calls to non-exported functions. The non-exported functions can be of a known type and/or be inline.

The determination of at least one hook to install can be based on a policy. The policy can specify which hook to install in response to a particular type of ransomware attack and actions for such hook to undertake. The actions for the hook to undertake can include various actions including one or more of: reporting requested parameters to the process space, changing control or parameters of a pre-installed hook, returning an error to a caller, or take no action. In some implementations, scanning of executable modules that are identified by the policy can be bypassed.

The IM can register a module load notification configured to scan new executable modules upon loading pursuant to the policy. A confidence level for hook locations in the next executable modules can be determined as part of the scanning. A confidence level for hook locations in the new executable modules can be determined upon loading. The IM, as part of the scanning, can identify a function entry point or code signature. The IM can determine the policy for one of the new executable modules (i.e., the location encompassing a DLL or executable) based on the identified function entry point or code signature. The IM can notify the at least one hook that a function entry point or code signature was discovered. This notification be used by the engine 230 and/or the monitoring platform 130 for various automated and, in some cases, manual processes to verify or otherwise configure the hook(s) and the like. Information associated with such notification can be mapped into the notified at least one hook. The mapped information can include one or more of location specific information, policy, calls required by the hook, and addresses of hooked functions.

The ransomware monitoring platform can execute on a server remote from the computing device. In other variations, the ransomware monitoring platform can execute on the computing device.

The computing environment associated with the computing device is or otherwise includes the computing device. In other variations, the computing environment associated with the computing device is a second, different computing device.

The process space can communicate with the agent by way of an intermediate driver.

In an interrelated aspect, an injected module is deployed in a process space executing on a computing device. The IM can be executed to inspect (e.g., scan, etc.) resources of the computing device and determine, based on the inspection of the resources, at least one hook to install in response to a ransomware attack. The process space can then install the at least one hook intercept calls in the process space. The at least one hook captures information characterizing techniques used in the ransomware attack. The process space then reports at least a portion of the captured parameters to an anti-ransomware monitoring platform. The anti-ransomware platform, based on the reporting, then initiates at least one remediation action to counter the ransomware attack.

The captured information can take various forms including, for example, encryption parameters and/or an encryption key.

The remediation action(s) can take various forms including receiving, by an agent executing on the computing device from the anti-ransomware monitoring platform, a decryption package responsive to the reported captured parameters, and decrypting, by the agent, one or more files in a computing environment associated with the computing device using the decryption package.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for less costly techniques (in terms of computing resources) for updating agents executing on endpoints to address security events such as ransomware attacks.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to a techniques for characterizing ransomware attacks and updating agents executing on various endpoints (i.e., monitored computing devices) to more effectively address or otherwise thwart security events such as ransomware or activities otherwise which causing monitored systems (i.e., endpoints having an agent installed thereon, etc.) to operate in an undesired manner. In particular, the current subject matter is directed to techniques for injecting modules into a monitored process space to selectively install hooks to identify parameters, encryption keys, and other data exchanges indicative or ransomware attacks so that remediation actions can be initiated.

Figure 1:
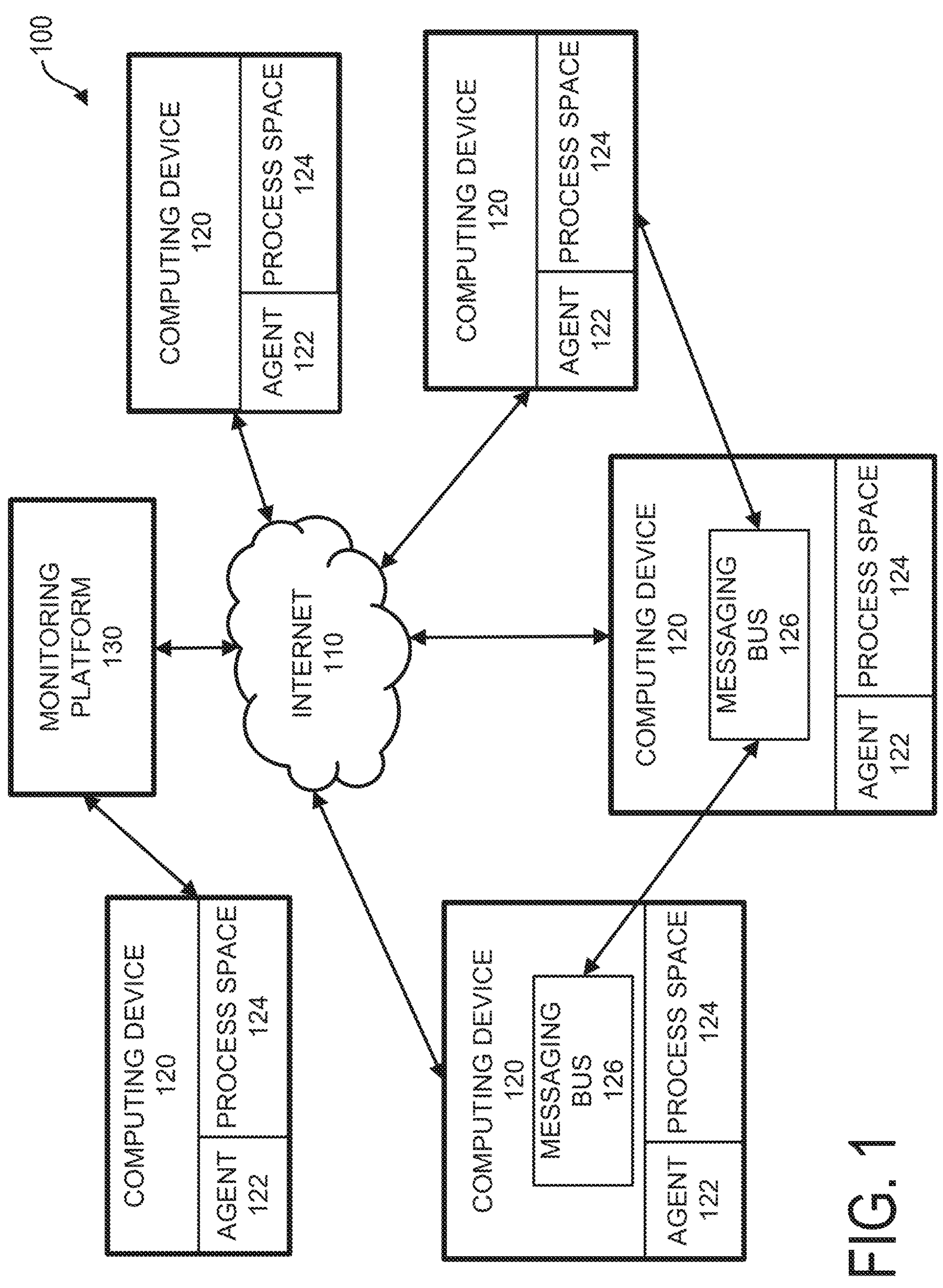
FIG. 1 is an architecture diagram illustrating aspects of a security monitoring platform in which agents are installed on computing devices.

FIG. 1 is an architecture diagram 100 in which a monitoring platform 130 can monitor and protect a plurality of computing devices 120 (e.g., endpoints, etc.) by way of the Internet 110 or by way of direct connections (e.g., on-premise protection, etc.). Each of the monitored computing device 120 can include at least one first agent 122 as well as a process space 124 (logically represented) executing thereon which can individually or in combination be used to locally analyze security events and/or to transmit data to the monitoring platform 130 which characterize security events. As used herein, the process space 124 can refer to memory allocated to a program so that it can store and access data while running. Each process executing in the process space 124 can have a unique flat address space that consists of virtual memory that it can addresses as well as the addresses it can use within that virtual memory. In some cases, the computing device 120 can execute a messaging bus 126 which selectively processes and transmits messages characterizing security events. The messaging bus 126 can generate, process, and transmit messages that are derived from security events generated or identified by the agent 122 and/or from other sources executing on the corresponding computing device 120 (including within the process space 124) or a peer computing device 120. Further details regarding the messaging bus 126 can be found in U.S. Pat. No. 12,130,914, the contents of which are hereby fully incorporated by reference.

In some cases, the agent 122 can be installed after a security event such as a ransomware attack. With this example, ransomware has already infiltrated at least one of the computing devices 120 and encrypted certain files for which a decryption key will be provided in exchange for a ransomware payment. In such cases, the agent 122 can be installed on the computing device(s) 120 to facilitate remediation of the security event. In the case of ransomware, the remediation can include decrypting the encrypted files and/or transporting the encrypted files to the monitoring platform 130 (or to a different cloud-based service). In order to facilitate local decryption, the agent 122 can collect information characterizing the encrypted files. For example, the agent 122 can identify or generate a list of files that were encrypted as well as the key material used in the encryption of each particular file. In order to identify the encrypted files, an algorithm can analyze the file name, extension and contents of a particular file to see if it is encrypted. Key material, in this context, refers to variables needed to create a key which can be dependent on the utilized encryption algorithm. The encryption information can be used to generate and deliver decryptor logic (i.e., logic/code to decrypt encrypted files) in the form of a surveyor transported in the form of a surveyor package. A surveyor can be a standalone component that can be run by the agent 122 in order to extend the functionality of the agent 122. The surveyor, when executed by the agent 122, can cause the encrypted files to be decrypted. In some cases, even if the decryptor logic is the same (i.e., a same encryption technique is used for all files), the key materials for each file might be different. Further details regarding surveyors and the updating of agents can be found in U.S. patent application Ser. No. 18/948,343 filed on Nov. 14, 2024, the contents of which are hereby fully incorporated by reference. Further, the agent 122 can pull and install various content which can, for example, be obtained from a remote data source 270.

Figure 2:
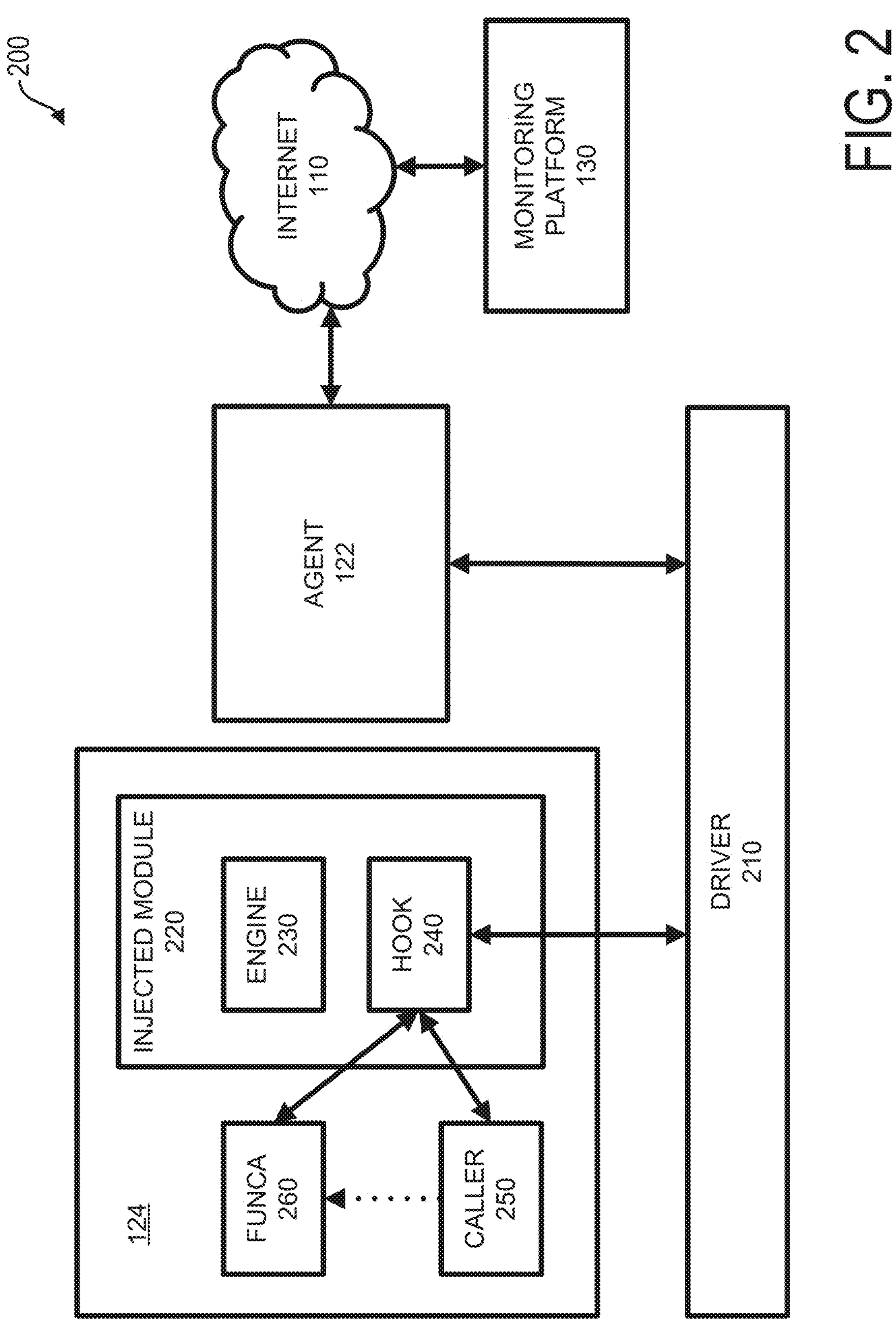
FIG. 2 is an architecture diagram illustrating an arrangement for injecting modules into a process space to characterize activities indicative of ransomware.

FIG. 2 is a diagram 200 illustrating aspects related to a monitored computing device 120 which executes various processes in the process space 124 and, in addition, executes an installed agent 122. The operating system (OS) of the monitored computing device 120 can provide a notification to a driver 210 that a process is about to launch. This notification can also identify modules that are to be loaded. The process space 124 can communicate with the agent 122 by way of tunneled communications with the driver 210.

In response to the launch of the new process, it can be determined, by the driver 210, whether the process should or can be injected into the process space 124. This determination can be made, for example, using rules or policies executed by the driver 210 which define which processes can have the injected module 220. These rule can be based, for example, on factors such as process compatibility, licensing issues, and the like. If a positive determination is made, preparation is commenced to inject a module 220 into the process space 124. If a positive determination is not made, or requires further processing time, then the loading of the process can be stopped or otherwise paused.

The injected module 220 can be initialized by the driver 210 in the process space. The injected module 220 can receive objects or functions from the driver 210 (which can be characterized, in this implementation as being an injector). The driver 210 can also identify, modify and map resources such as configuration information blocks available to the computing device 120. Resources can, for example, be pointers within applications. The mapping can be performed, for example, by the driver 210 finding resource locations using a signature check. The driver 210 can then directly update the configuration as needed (e.g., when specific DLLs are loaded, etc.). More fluid configuration information can be passed through a messaging scheme such as DeviceIoControl. Further, the driver 210 can be configured to provide tunneled communications with the agent 124 to facilitate, for example, secure exchange of the objects and functions.

The injected module 220 can instantiate an engine 230 which executes various operations and processes. Engine 230, in this context, can refer to software (i.e., code/instructions) to execute a functional workflow. The engine 230 can inspect resources within the process space 124 in order to determine which hooks to install. This determination can be based on scanning memory blocks within the process space 124 to identify code signatures of known modules or functions. Resources can include, for example, import tables, executable code sections (e.g., .text files, etc.) and the like. This identification can, for example, be performed by loading rules (e.g., YARA rules, etc.) into memory to identify code signatures (i.e., series of bytes) identified through the scanning. These rules, for example, can be a set of instruction to help identify and classify malicious software or malware based on the scanned code signatures.

In the example of FIG. 2, a hook 240 is implemented such that calls from a first function 250 (labeled as caller) are routed through the hook 240 to a second function 260 (labeled as funcA). Without the hook 240, the calls would be direct from the first function 250 to the second function 260. The hook 240 captures parameters, encryption keys, and/or other data associated with the call. The first function 250 and/or the second function 260 can, for example, be part of a different injected module. The parameters captured by the hook 240 can characterize one or more of via registers, stacks, handles, referenced memory blocks, size of memory blocks, and the like. The injected module 220 can cause one or more of these parameters to be reported to the monitoring platform 130 by way of the driver 210, the agent 122, and the internet 110. Rules can define which parameters captured by the hook 240 and how such parameters are reported or otherwise consumed by a downstream application or process.

The engine 230 can register a load module notification with the driver 210 relative to the process space 124. As an example, the process space 124 can have an injected library (e.g., dynamic-link library) and a process may intentionally load another library as part of a normal workflow. The load module notification can be used to ensure whether the new injection (i.e., the newly loaded library) needs to be scanned or hooked. Rule can define that certain modules/library and/or certain memory modules need not be scanned.

The engine 230 can also apply a location policy to, for example, override notifications and/or other hook functionality. With the example of FIG. 2, the location policy can specify which functions to be hooked and which functions to bypass. The location policy can also specify when the hook 240 captures the parameters, encryption keys and/or other data and takes corresponding action. For example, the location policy can specify what information to report to the agent 122 and on what basis (periodically, trigger-based, etc.).

The engine 230 can also gather various information such as context and policy. By checking the policy (which can specify control, monitor, report and/or disable, etc.), the engine 230 can add call context and chain necessary instructions to call other APIs as needed (e.g., call the driver 210, etc.).

Figure 3:
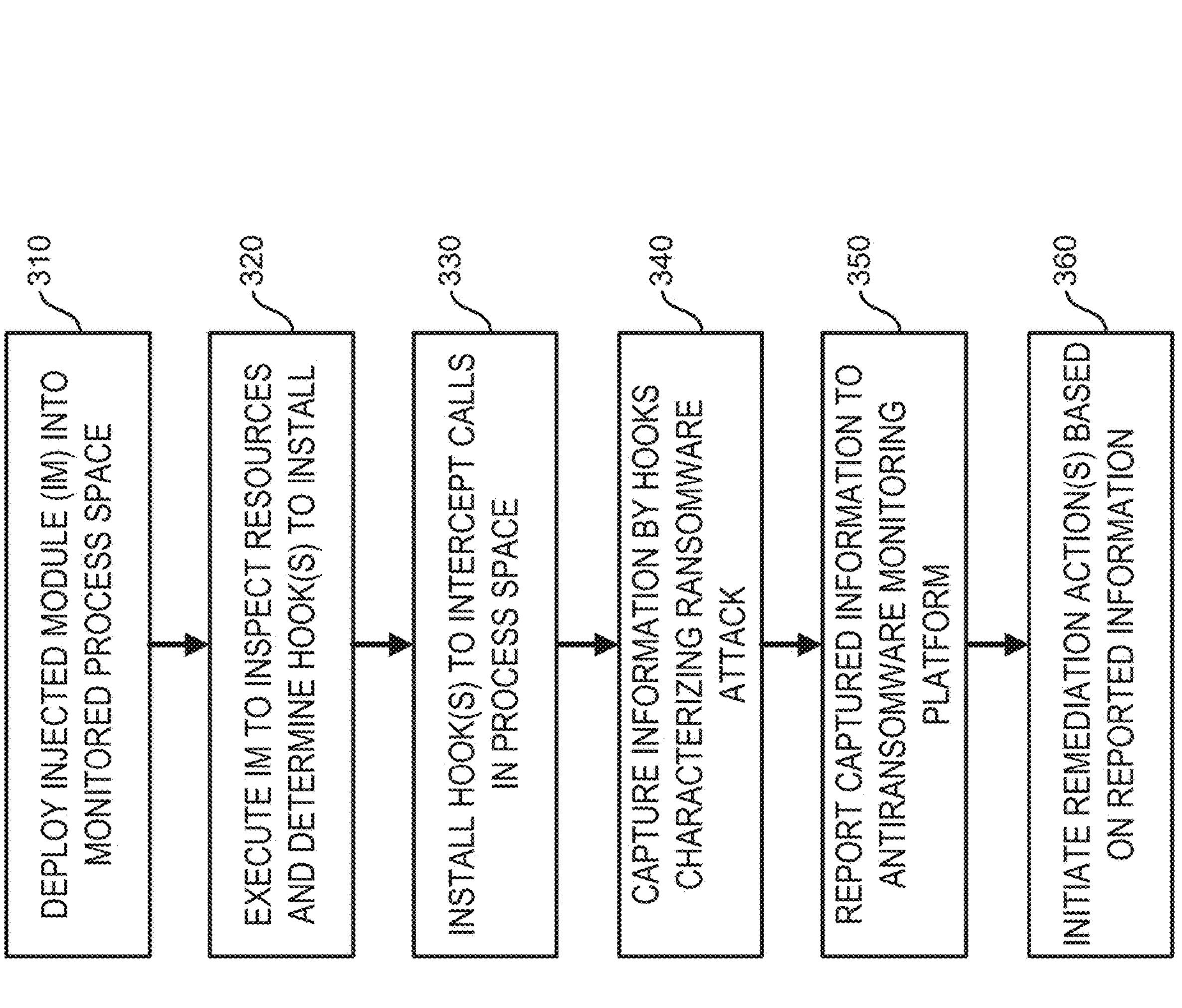
FIG. 3 is a diagram illustrating a process for countering ransomware by selectively deploying hooks within a monitored process space.

FIG. 3 is a process flow diagram 300 in which, at 310, an injected module is deployed (e.g., injected, etc.) into a process space executing on a computing device. Thereafter, at 320, the injected module, while executing in the process space, inspects resources of the computing device and based on such inspection, determines at least one hook to install in response to or to prevent a ransomware attack. The process space then, at 330, installs at one hook which, at 340, intercepts calls (e.g., API calls, etc.) to capture parameters, encryption keys and/or other information characterizing techniques used in the ransomware attack. The process space then reports, at 350, at least a portion of the captured information to an anti-ransomware platform. The anti-ransomware platform 360 can then, optionally, initiate one or more remediation actions to counter the ransomware attack.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED, OLED, or LCD screen/monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:

deploying, in a process space executing on a computing device, an injected module (IM) by mapping the IM into an address space of a monitored application process;

executing the IM to (i) inspect resources of the computing device by scanning memory blocks in the process space to identify code signatures of known modules or functions and (ii) determine, based on the inspection of the resources, at least one hook to install in response to a ransomware attack, the at least one hook being determined using rules which associate the identified code signatures of known modules or functions with a specific type of malware and selecting hook locations within an executable code section of a loaded module;

installing, by the process space, the determined at least one hook to intercept calls within the process space;

capturing, by the at least one hook, parameters characterizing techniques used in the ransomware attack including one or more of register values, stack values, handles, referenced memory blocks, or sizes of memory blocks associated with an intercepted call;

reporting, by the process space, at least a portion of the captured parameters to an anti-ransomware monitoring platform by transmitting the captured parameters via an intermediate driver to an agent that forwards the captured parameters to the anti-ransomware monitoring platform;

receiving, by an agent executing on the computing device from the anti-ransomware monitoring platform, a decryption package responsive to the reported captured parameters, the decryption package comprising decryptor logic generated based on key material included in the reported captured parameters; and decrypting, by the agent, one or more files in a computing environment associated with the computing device using the decryption package by executing the decryption package as a standalone component run by the agent to extend functionality of the agent.

2. The method of claim 1 further comprising:

causing, by the agent, the decrypted one or more files to be transported from the computing environment to a safe computing environment.

3. The method of claim 1, wherein the inspected resources comprise one or more cryptography libraries.

4. The method of claim 1, wherein the inspected resources comprise one or more data exfiltration and networking libraries.

5. The method of claim 1, wherein the determination of at least one hook to install is based on the captured parameters indicating calls to exported functions by way of a particular type of library.

6. The method of claim 1, wherein the determination of at least one hook to install is based on the captured parameters indicating calls to non-exported functions.

7. The method of claim 6, wherein the non-exported functions are of a known type.

8. The method of claim 6, wherein the non-exported functions are inline.

9. The method of claim 1, wherein the determination of at least one hook to install is based on a policy.

10. The method of claim 9, wherein the policy specifies which hook to install in response to a particular type of ransomware attack and actions for the hook to undertake.

11. The method of claim 10, wherein the actions for the hook to undertake include one or more of: reporting requested parameters to the process space, changing control or parameters of a pre-installed hook, returning an error to a caller, or taking no action.

12. The method of claim 9 further comprising:

bypassing scanning of executable modules identified as excluded by the policy.

13. The method of claim 9 further comprising:

registering, by the IM, a module load notification configured to scan new executable modules upon loading pursuant to the policy.

14. The method of claim 13 further comprising:

determining, as part of the scanning, a confidence level for hook locations in the new executable modules upon loading.

15. The method of claim 13 further comprising:
identifying, as part of the scanning and by the IM, a function entry point or code signature in one of the new executables.

16. The method of claim 15 further comprising:
determining, by the IM, the policy for one of the new executable modules based on the identified function entry point or code signature.

17. The method of claim 16 further comprising:
notifying, by the IM, the at least one hook that a function entry point or code signature was discovered.

18. The method of claim 17 further comprising:
mapping information associated with the notification into the hook.

19. The method of claim 18, wherein the mapped information comprises one or more of location specific information, policy, calls required by the hook, and addresses of hooked functions.

20. The method of claim 1, wherein the ransomware monitoring platform is executing on a server remote from the computing device or is executing on the computing device.

21. The method of claim 1, wherein the computing environment associated with the computing device is the computing device.

22. The method of claim 1, wherein the computing environment associated with the computing device is a second, different computing device.

23. The method of claim 1, wherein the process space communicates with the agent by way of an intermediate driver.

24. A system comprising:
at least one data processor; and
memory storing instructions which, when executed by the at least one data processor, result in operations comprising:
deploying, in a process space executing on a computing device, an injected module (IM) by mapping the IM into an address space of a monitored application process;
executing the IM to (i) inspect resources of the computing device by scanning memory blocks in the process space to identify code signatures of known modules or functions and (ii) determine, based on the inspection of the resources, at least one hook to install in response to a ransomware attack, the at least one hook being determined using rules which associate the identified code signatures of known modules or functions with a specific type of malware and selecting hook locations within an executable code section of a loaded module;
installing, by the process space, the determined at least one hook to intercept calls within the process space;
capturing, by the at least one hook, parameters characterizing techniques used in the ransomware attack including one or more of register values, stack values, handles, referenced memory blocks, or sizes of memory blocks associated with an intercepted call;
reporting, by the process space, at least a portion of the captured parameters to an anti-ransomware monitoring platform by transmitting the captured parameters via an intermediate driver to an agent that forwards the captured parameters to the anti-ransomware monitoring platform;
receiving, by an agent executing on the computing device from the anti-ransomware monitoring platform, a decryption package responsive to the reported captured parameters, the decryption package comprising decryptor logic generated based on key material included in the reported captured parameters; and
decrypting, by the agent, one or more files in a computing environment associated with the computing device using the decryption package by executing the decryption package as a standalone component run by the agent to extend functionality of the agent.

25. The system of claim 24, wherein the inspected resources comprise one or more cryptography libraries and one or more data exfiltration and networking libraries.

26. The system of claim 24, wherein the determination of at least one hook to install is based on a policy that specifies which hook to install in response to a particular type of ransomware attack and actions for the hook to undertake.

27. The system of claim 24, wherein the determination of at least one hook to install is based on a policy, the operations further comprising: bypassing scanning of executable modules identified as excluded by the policy; and registering, by the IM, a module load notification configured to scan new executable modules upon loading pursuant to the policy.

28. The system of claim 24, wherein the determination of at least one hook to install is based on a policy, the operations further comprising: registering, by the IM, a module load notification configured to scan new executable modules upon loading pursuant to the policy; identifying, as part of the scanning and by the IM, a function entry point or code signature in one of the new executables; and determining, by the IM, the policy for one of the new executable modules based on the identified function entry point or code signature.

29. The system of claim 24, wherein the anti-ransomware monitoring platform is executing on a server remote from the computing device or is executing on the computing device, the computing environment associated with the computing device is a second, different computing device, and the operations further comprise causing, by the agent, the decrypted one or more files to be transported from the computing environment to a safe computing environment.

30. A system comprising:
means for deploying, in a process space executing on a computing device, an injected module (IM) by mapping the IM into an address space of a monitored application process;
means for executing the IM to (i) inspect resources of the computing device by scanning memory blocks in the process space to identify code signatures of known modules or functions and (ii) determine, based on the inspection of the resources, at least one hook to install in response to a ransomware attack, the at least one hook being determined using rules which associate the identified code signatures of known modules or functions with a specific type of malware and selecting hook locations within an executable code section of a loaded module;
means for installing, by the process space, the determined at least one hook to intercept calls within the process space;
means for capturing, by the at least one hook, parameters characterizing techniques used in the ransomware attack including one or more of register values, stack values, handles, referenced memory blocks, or sizes of memory blocks associated with an intercepted call;
means for reporting, by the process space, at least a portion of the captured parameters to an anti-ransomware monitoring platform by transmitting the captured parameters via an intermediate driver to an agent that forwards the captured parameters to the anti-ransomware monitoring platform;

means for receiving, by an agent executing on the computing device from the anti-ransomware monitoring platform, a decryption package responsive to the reported captured parameters, the decryption package comprising decryptor logic generated based on key material included in the reported captured parameters; and means for decrypting, by the agent, one or more files in a computing environment associated with the computing device using the decryption package by executing the decryption package as a standalone component run by the agent to extend functionality of the agent.

* * * * *